(12) United States Patent
Bruno et al.

(10) Patent No.: US 12,214,888 B2
(45) Date of Patent: Feb. 4, 2025

(54) AIRCRAFT ENVIRONMENTAL CONTROL SYSTEM

(71) Applicant: Hamilton Sundstrand Corporation, Charlotte, NC (US)

(72) Inventors: Louis J. Bruno, Ellington, CT (US); Tony Ho, Glastonbury, CT (US); Aiden Coutin, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/390,042

(22) Filed: Jul. 30, 2021

(65) Prior Publication Data

US 2022/0033090 A1    Feb. 3, 2022

Related U.S. Application Data

(60) Provisional application No. 63/058,828, filed on Jul. 30, 2020.

(51) Int. Cl.
*B64D 13/00* (2006.01)
*B64D 13/06* (2006.01)
(Continued)

(52) U.S. Cl.
CPC .............. *B64D 13/08* (2013.01); *B64D 13/06* (2013.01); *F25B 9/004* (2013.01); *F25B 9/06* (2013.01);
(Continued)

(58) Field of Classification Search
CPC ................... B64D 13/08; B64D 13/06; B64D 2013/0618; B64D 2013/064;
(Continued)

(56) References Cited

U.S. PATENT DOCUMENTS 2,777,301 A   1/1957   John
4,374,469 A   2/1983   Rannenberg
(Continued)

FOREIGN PATENT DOCUMENTS

CN      108357682 A      8/2018
EP        1112930 A2      7/2001
(Continued)

OTHER PUBLICATIONS

European Office Action for European Application No. 21188717.9; Report Mail Date May 24, 2023 (pp. 1-6).
(Continued)

*Primary Examiner* — Phutthiwat Wongwian
*Assistant Examiner* — Sherman D Manley
(74) *Attorney, Agent, or Firm* — CANTOR COLBURN LLP (57) ABSTRACT

An air cycle machine for an environmental control system for an aircraft includes at least one turbine configured to receive and extract work from a first medium and a third medium. A compressor is configured to compress a second medium and a shaft mechanically couples the at least one turbine and the compressor. A mixing point is located downstream of at least one turbine. A mixture of the first medium and the third medium generated at the mixing point is provided to another component of the environmental control system.

12 Claims, 6 Drawing Sheets

(51) Int. Cl.
*B64D 13/08* (2006.01)
*F25B 9/00* (2006.01)
*F25B 9/06* (2006.01)

(52) U.S. Cl.
CPC ............... *B64D 2013/0618* (2013.01); *B64D 2013/064* (2013.01); *B64D 2013/0662* (2013.01); *B64D 2013/0688* (2013.01)

(58) Field of Classification Search
CPC .... B64D 2013/0662; B64D 2013/0648; B64D 2013/0688; F25B 9/004; F25B 9/06; Y02T 50/50
See application file for complete search history.

(56) References Cited

U.S. PATENT DOCUMENTS

| | | |
|---|---|---|
| 4,419,926 A | 12/1983 | Cronin et al. |
| 5,025,642 A | 6/1991 | Brunskill et al. |
| 5,299,763 A | 4/1994 | Bescoby et al. |
| 5,442,905 A | 8/1995 | Claeys et al. |
| 5,461,882 A * | 10/1995 | Zywiak .................. B64D 13/06 62/401 |
| 5,887,445 A | 3/1999 | Murry et al. |
| 5,899,085 A | 5/1999 | Williams |
| 6,128,909 A | 10/2000 | Jonqueres |
| 6,148,622 A | 11/2000 | Sanger |
| 6,199,387 B1 | 3/2001 | Sauterleute |
| 6,250,097 B1 | 6/2001 | Lui et al. |
| 6,427,471 B1 | 8/2002 | Ando et al. |
| 6,526,775 B1 | 3/2003 | Asfia et al. |
| 6,684,660 B1 | 2/2004 | Bruno et al. |
| 6,981,388 B2 | 1/2006 | Brutscher et al. |
| 7,222,499 B2 | 5/2007 | Hunt |
| 7,578,136 B2 | 4/2009 | Derouineau et al. |
| 7,673,459 B2 | 3/2010 | Sheldon et al. |
| 9,481,468 B1 | 11/2016 | Schiff |
| 9,555,893 B2 | 1/2017 | Squier |
| 9,669,936 B1 | 6/2017 | Fiterman et al. |
| 10,137,993 B2 | 11/2018 | Bruno et al. |
| 10,160,547 B2 | 12/2018 | Bruno et al. |
| 10,202,197 B2 | 2/2019 | Bammann et al. |
| 10,207,809 B2 | 2/2019 | Koerner et al. |
| 10,232,948 B2 | 3/2019 | Bruno et al. |
| 10,239,624 B2 | 3/2019 | Behrens et al. |
| 10,457,399 B2 | 10/2019 | Bammann et al. |
| 10,501,191 B1 | 12/2019 | Dooley et al. |
| 10,526,092 B2 | 1/2020 | Defrancesco |
| 10,549,860 B2 | 2/2020 | Bruno et al. |
| 10,569,886 B2 | 2/2020 | Klimpel et al. |
| 10,633,098 B2 | 4/2020 | Shea |
| 2003/0005718 A1 | 1/2003 | Mitani et al. |
| 2004/0172963 A1 | 9/2004 | Axe et al. |
| 2015/0166187 A1 | 6/2015 | Durbin et al. |
| 2015/0329210 A1 | 11/2015 | Bammann et al. |
| 2016/0083100 A1 | 3/2016 | Bammann et al. |
| 2016/0347456 A1 | 12/2016 | Bruno et al. |
| 2017/0275004 A1 | 9/2017 | Bammann et al. |
| 2017/0341758 A1 | 11/2017 | Bruno et al. |
| 2017/0341761 A1 | 11/2017 | Bruno et al. |
| 2017/0341768 A1 | 11/2017 | Bruno et al. |
| 2017/0342838 A1 | 11/2017 | Bruno et al. |
| 2018/0057172 A1 | 3/2018 | Sautron |
| 2018/0215473 A1 | 8/2018 | Army et al. |
| 2018/0237143 A1 | 8/2018 | Bombled et al. |
| 2018/0297709 A1* | 10/2018 | Bruno .................. B64D 13/02 |
| 2019/0002108 A1* | 1/2019 | Bruno .................. B64D 13/06 |
| 2019/0112052 A1 | 4/2019 | Bruno et al. |
| 2019/0135440 A1* | 5/2019 | Bruno .................. B64D 13/06 |
| 2019/0225343 A1 | 7/2019 | Bruno et al. |
| 2019/0291875 A1 | 9/2019 | Behrens et al. |
| 2019/0389587 A1 | 12/2019 | Bruno et al. |
| 2020/0182550 A1 | 6/2020 | Army et al. |
| 2021/0001992 A1* | 1/2021 | Ho .................. B64D 13/06 |
| 2022/0033084 A1 | 2/2022 | Bruno et al. |
| 2022/0033085 A1 | 2/2022 | Bruno et al. |
| 2022/0033086 A1 | 2/2022 | Bruno et al. |
| 2022/0033087 A1 | 2/2022 | Bruno et al. |
| 2022/0033089 A1 | 2/2022 | Bruno et al. |
| 2022/0033091 A1 | 2/2022 | Bruno et al. |
| 2022/0033092 A1 | 2/2022 | Bruno et al. |
| 2022/0033093 A1 | 2/2022 | Bruno et al. |

FOREIGN PATENT DOCUMENTS

| | | |
|---|---|---|
| EP | 2862803 A1 | 4/2015 |
| EP | 2937287 A1 | 10/2015 |
| EP | 2939927 A1 | 11/2015 |
| EP | 3248879 A1 | 11/2017 |
| EP | 3249198 A1 | 11/2017 |
| EP | 3354573 A1 | 8/2018 |
| EP | 3354576 A1 | 8/2018 |
| EP | 3363740 A1 | 8/2018 |
| EP | 3489142 A1 | 11/2018 |
| EP | 3098165 B1 | 1/2019 |
| EP | 3470337 A1 | 4/2019 |
| EP | 3480113 A1 | 5/2019 |
| EP | 3514065 A1 | 7/2019 |
| EP | 3543131 A1 | 9/2019 |
| EP | 3587269 A1 | 1/2020 |
| EP | 3760542 A1 | 6/2021 |
| EP | 3835209 A1 | 6/2021 |
| GB | 2398864 A | 9/2004 |
| JP | 2001328596 A | 11/2001 |
| JP | 2005067356 A | 3/2005 |
| JP | 2006078092 A | 3/2006 |

OTHER PUBLICATIONS

U.S. Non-Final Office Action dated Jun. 5, 2023 for U.S. Appl. No. 17/390,200; Filing Date Jul. 30, 2021; (pp. 1-30).
European Extended Search Report; European Application No. 21188717.9; Date: Jan. 4, 2022; 11 pages.
European Extended Search Report; European Application No. 21188736.9; Date: Jan. 4, 2022; 11 pages.
European Extended Search Report; European Application No. 21188746.8; Date: Jan. 4, 2022; 11 pages.
European Extended Search Report; European Application No. 21188755.9; Date: Jan. 4, 2022; 10 pages.
European Extended Search Report; European Application No. 21188762.5; Date: Jan. 4, 2022; 12 pages.
European Extended Search Report; European Application No. 21188779.9; Date: Jan. 4, 2022; 8 pages.
European Extended Search Report; European Application No. 21188819.3; Date: Jan. 4, 2022; 9 pages.
European Extended Search Report; European Application No. 21188914.2; Date: Jan. 4, 2022; 9 pages.
European Extended Search Report; European Application No. 21188926.6; Date: Jan. 5, 2022; 8 pages.
U.S. Non-Final Office Action dated Nov. 17, 2022 for U.S. Appl. No. 17/390,095, filed Jul. 30, 2021; Report Mail Date Nov. 17, 2022 (pp. 1-25).
U.S. Non-Final Office Action Dated Nov. 16, 2022 for U.S. Appl. No. 17/390,139, filed Jul. 30, 2021; Report Mail Date Nov. 16, 2022 (pp. 1-22).
U.S. Non-Final Office Action Dated Dec. 22, 2022 for U.S. Appl. No. 17/390,167, filed Jul. 30, 2021; Report Mail Date Dec. 22, 2022 (pp. 1-25).
U.S. Non-Final Office Action dated Jan. 5, 2023 for U.S. Appl. No. 17/390,116, filed Jul. 30, 2021; Report Mail Date Jan. 5, 2023 (pp. 1-22).
U.S. Non-Final Office Action dated Mar. 1, 2023 for U.S. Appl. No. 17/390,077, filed Jul. 30, 2021; (pp. 1-28).
U.S. Non-Final Office Action dated Mar. 17, 2023 for U.S. Appl. No. 17/390,188, filed Jul. 30, 2021; (pp. 1-37).
European Office Action; European Application No. 21188736.9; Date: May 23, 2023; 6 pages.
European Office Action; European Application No. 21188746.8; Date: May 24, 2023; 6 pages.

(56) References Cited

OTHER PUBLICATIONS

European Office Action; European Application No. 21188755.9; Date: May 30, 2023; 5 pages.
European Office Action; European Application No. 21188762.5; Date: May 30, 2023; 5 pages.
European Office Action for European Application No. 21188914.2; Report Mail Date Aug. 18, 2023 (pp. 1-5).
European Office Action for European Application No. 21188779.9; Report Mail Date Aug. 17, 2023 (pp. 1-4).
U.S. Final Office Action Dated for U.S. Appl. No. 17/390,188, filed Jul. 30, 2021; Report Mail Date Aug. 18, 2023 (pp. 1-18).
Office Action issued in European Patent Application No. 21188762.5; Application Filing Date Jul. 30, 2021; Date of Mailing Nov. 8, 2024 (5 pages).
Office Action issued in European Patent Application No. 21188755.9; Application Filing Date Jul. 30, 2021; Date of Mailing Nov. 8, 2024 (6 pages).

\* cited by examiner

AIRCRAFT ENVIRONMENTAL CONTROL SYSTEM

CROSS-REFERENCE TO RELATED APPLICATIONS

This application claims the benefit of U.S. Provisional Application No. 63/058,828 filed Jul. 30, 2020, the disclosure of which is incorporated herein by reference in its entirety.

BACKGROUND

Embodiments of the disclosure relate to environmental control systems, and more specifically to an environmental control system of an aircraft.

Aircraft need to have their internal environment controlled. In general, contemporary air conditioning systems are supplied a pressure at cruise that is approximately 30 psig to 35 psig. The trend in the aerospace industry today is towards systems with higher efficiency. One approach to improve efficiency of an aircraft environmental control system is to eliminate the bleed air entirely and use electrical power to compress outside air. A second approach is to use lower engine pressure. The third approach is to use the energy in the cabin outflow air to compress outside air and bring it into the cabin. Each of these approaches provides a reduction in airplane fuel burn.

BRIEF DESCRIPTION

According to an embodiment, an environmental control system of an aircraft including a plurality of inlets for receiving a plurality of mediums including a first medium, a second medium, and a third medium and an outlet for delivering a conditioned flow of the second medium to one or more loads of the aircraft. The environmental control system additionally includes a first compressing device and a second compressing device. The second compressing device is arranged in fluid communication with the first compressing device and the outlet. An inlet of the second compressing device is directly connected to an outlet of the first compressing device, and the first compressing device is driven by energy extracted from the first medium. The first medium is a flow of bleed air.

In addition to one or more of the features described above, or as an alternative, in further embodiments the first compressing device is simultaneously driven by the third medium.

In addition to one or more of the features described above, or as an alternative, in further embodiments the first compressing device includes a compressor operably coupled to at least one turbine via a shaft.

In addition to one or more of the features described above, or as an alternative, in further embodiments the at least one turbine is a dual entry turbine having a first nozzle configured to receive the first medium and a second nozzle configured to receive the third medium.

In addition to one or more of the features described above, or as an alternative, in further embodiments the at least one turbine includes a first turbine and a second turbine.

In addition to one or more of the features described above, or as an alternative, in further embodiments the first medium is provided to the first turbine and the third medium is provided to the second turbine.

In addition to one or more of the features described above, or as an alternative, in further embodiments the first medium and the third medium and mixed downstream from both the first turbine and the second turbine.

In addition to one or more of the features described above, or as an alternative, in further embodiments the first medium and the third medium and mixed downstream from the first turbine and upstream from the second turbine.

In addition to one or more of the features described above, or as an alternative, in further embodiments the first medium is provided to the first turbine and the second turbine in series, and the third medium is provided to the second turbine.

In addition to one or more of the features described above, or as an alternative, in further embodiments the first turbine and the second turbine are located at opposite ends of the shaft.

In addition to one or more of the features described above, or as an alternative, in further embodiments comprising a ram air circuit including a ram air shell having at least one heat exchanger positioned therein and a dehumidification system arranged in fluid communication with the ram air circuit.

In addition to one or more of the features described above, or as an alternative, in further embodiments an outlet of the at least one turbine is arranged in fluid communication with a portion of the dehumidification system.

In addition to one or more of the features described above, or as an alternative, in further embodiments an outlet of the at least one turbine is arranged in fluid communication with the ram air circuit.

In addition to one or more of the features described above, or as an alternative, in further embodiments the first compressing device includes a first compressor and the second compressing device includes a second compressor, the first compressor and the second compressor being arranged in series relative to a flow of the second medium.

According to an embodiment, an air cycle machine for an environmental control system for an aircraft, the air cycle machine includes at least one turbine configured to receive and extract work from a first medium and a third medium. A compressor is configured to compress a second medium and a shaft mechanically couples the at least one turbine and the compressor. A mixing point is located downstream of at least one turbine. A mixture of the first medium and the third medium generated at the mixing point is provided to another component of the environmental control system.

In addition to one or more of the features described above, or as an alternative, in further embodiments the at least one turbine includes a first turbine configured to receive and extract work from the first medium and a second turbine configured to receive and extract work from the third medium.

In addition to one or more of the features described above, or as an alternative, in further embodiments the mixing point is located downstream of the first turbine and the second turbine.

In addition to one or more of the features described above, or as an alternative, in further embodiments the first turbine is positioned adjacent a first end of the shaft and the second turbine is positioned adjacent a second end of the shaft.

In addition to one or more of the features described above, or as an alternative, in further embodiments the first turbine is positioned adjacent a first end of the shaft and the compressor is positioned adjacent a second end of the shaft.

In addition to one or more of the features described above, or as an alternative, in further embodiments the mixing point is located upstream of the second turbine.

In addition to one or more of the features described above, or as an alternative, in further embodiments the first turbine and the second turbine are arranged in series such that the second turbine is also configured to receive and extract work from the first medium.

In addition to one or more of the features described above, or as an alternative, in further embodiments the at least one turbine includes a first nozzle for receiving the first medium and a second nozzle for receiving the third medium.

In addition to one or more of the features described above, or as an alternative, in further embodiments the first medium is bleed air.

In addition to one or more of the features described above, or as an alternative, in further embodiments the second medium is fresh air.

In addition to one or more of the features described above, or as an alternative, in further embodiments the third medium is cabin air.

In addition to one or more of the features described above, or as an alternative, in further embodiments comprising a ram air circuit having at least one ram air heat exchanger arranged therein, wherein the at least one ram air heat exchanger is the another component of the environmental control system.

In addition to one or more of the features described above, or as an alternative, in further embodiments a divider is arranged within the ram air circuit to form a first region and a second region, the at least one heat exchanger having a first portion arranged within the first region and a second portion arranged within the second region.

In addition to one or more of the features described above, or as an alternative, in further embodiments the mixture of the first medium and the third medium is delivered to the second region of the ram air circuit.

According to an embodiment, a compressing device for use in an environmental control system includes at least one turbine configured to provide energy by expanding one or more medium. The one or more mediums provided at an outlet of the at least one turbine form a heat sink within the environmental control system. A compressor is configured to receive energy from the one or more mediums expanded across the at least one turbine. During a first mode of the compressing device, energy derived from a first medium of the one or more mediums is used to compress a second medium at the compressor and during a second mode of the compressing device, energy derived from both the first medium and a third medium of the one or more mediums is used to compress a second medium at the compressor.

In addition to one or more of the features described above, or as an alternative, in further embodiments the at least one turbine includes a first turbine configured to receive and extract work from the first medium and a second turbine configured to receive and extract work from the third medium.

In addition to one or more of the features described above, or as an alternative, in further embodiments the first turbine and the second turbine are arranged in series such that the second turbine is also configured to receive and extract work from the first medium.

In addition to one or more of the features described above, or as an alternative, in further embodiments the at least one turbine includes a first nozzle for receiving the first medium and a second nozzle for receiving the third medium.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments herein provide an environmental control system of an aircraft that mixes mediums from different sources to power the environmental control system and to provide cabin pressurization and cooling at a high fuel burn efficiency. The medium can generally be air, while other examples include gases, liquids, fluidized solids, or slurries.

Figure 1:
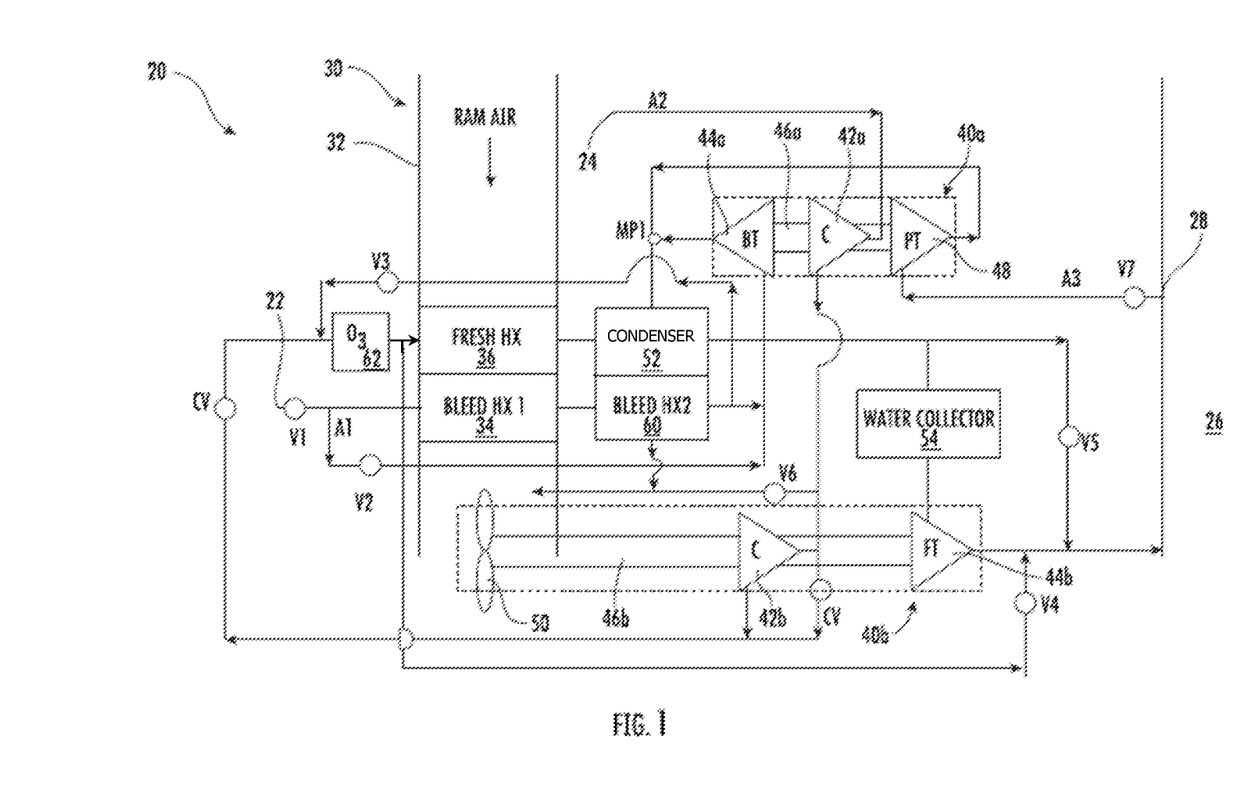
FIG. 1 is a simplified schematic of a system according to an embodiment.

With reference now to FIG. 1, a schematic diagram of a portion of an environment control system (ECS) 20, such as an air conditioning unit or pack for example, is depicted according to non-limiting embodiments. Although the environmental control system 20 is described with reference to an aircraft, alternative applications are also within the scope of the disclosure. As shown in the FIGS., the system 20 can receive a first medium A1 at a first inlet 22. In embodiments where the environmental control system 20 is used in an aircraft application, the first medium A1 may be bleed air, which is pressurized air originating from i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

The system 20 is also configured to receive a second medium A2 at an inlet 24 and may provide a conditioned form of at least one of or both of the first medium A1 and the second medium A2 to a volume 26. In an embodiment, the second medium A2 is fresh air, such as outside air for example. The outside air can be procured via one or more scooping mechanisms, such as an impact scoop or a flush scoop for example. Thus, the inlet 24 can be considered a fresh or outside air inlet. In an embodiment, the second medium A2 is ram air drawn from a portion of a ram air circuit to be described in more detail below. Generally, the second medium A2 described herein is at an ambient pressure equal to an air pressure outside of the aircraft when the aircraft is on the ground, and is between an ambient pressure and a cabin pressure when the aircraft is in flight.

The system 20 may further be configured to receive a third medium A3 at an inlet 28. In one embodiment, the inlet 28 is operably coupled to a volume 26, such as the cabin of an aircraft, and the third medium A3 is cabin discharge air, which is air leaving the volume 26 and that would typically be discharged overboard. In some embodiments, the system 20 is configured to extract work from the third medium A3. In this manner, the pressurized air A3 of the volume 26 can be utilized by the system 20 to achieve certain operations.

The environmental control system 20 includes a RAM air circuit 30 including a shell or duct, illustrated schematically in broken lines at 32, within which one or more heat exchangers are located. The shell 32 can receive and direct a medium, such as ram air for example, through a portion of the system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a first or primary heat exchanger 34 and a second or secondary heat exchanger 36. However, it should be understood that a RAM air circuit 30 having any number of ram air heat exchangers, such as a single heat exchanger, or more than two heat exchangers, is contemplated herein. Within the heat exchangers 34, 36, ram air, such as outside air for example, acts as a heat sink to cool a medium passing there through, for example the first medium A1 and/or the second medium A2.

The system 20 additionally comprises at least one compressing device. In the illustrated, non-limiting embodiments, the system 20 includes a first compressing device 40*a* and a second compressing device 40*b*. However, embodiments including only a single compressing device, or alternatively, embodiments including more than two compressing devices are also within the scope of the disclosure. Further, as shown, at least a portion of the first compressing device 40*a* and the second compressing device 40*b* may be arranged in series relative to a flow of a medium, such as the second medium A2 for example, through the system 20. The first and second compressing devices 40*a*, 40*b* may, but need not have different configurations and components.

In the illustrated, non-limiting embodiment, the compressing devices 40*a*, 40*b* of the system 20 are mechanical devices that include components for performing thermodynamic work on a medium (e.g., extracts work from or applies work to the first medium A1, the second medium A2, and/or the third medium A3 by raising and/or lowering pressure and by raising and/or lowering temperature). Examples of each compressing device 40 include an air cycle machine, a two-wheel air cycle machine, a three-wheel air cycle machine, a four-wheel air cycle machine, etc.

Figure 2:
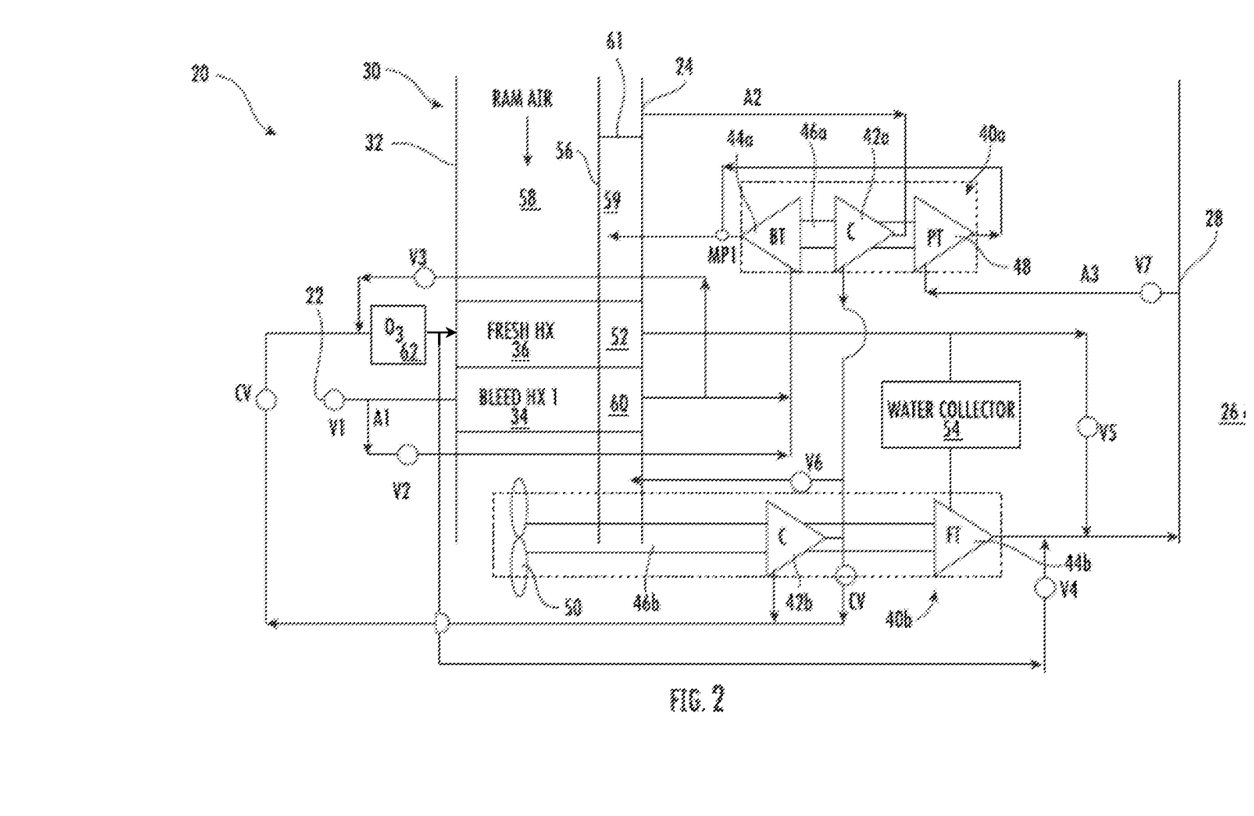
FIG. 2 is a simplified schematic of a system according to another embodiment.

In the non-limiting embodiment of FIGS. 1 and 2, the first compressing device 40*a* is a three-wheel air cycle machine including a compressor 42*a* and a turbine 44 operably coupled to each other via a shaft 46*a*. The compressor 42*a* is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42*a* is configured to receive and pressurize the second medium A2. In the illustrated, non-limiting embodiment, the first compressing device additionally includes a power turbine 48, operably coupled to the compressor 42*a* via the shaft 46*a*. The turbine 44*a* and the power turbine 48 are mechanical devices operable to expand a medium and extract work therefrom (also referred to as extracting energy) to drive the compressor 42*a* via the shaft 46*a*. The first turbine 44 and the power turbine 48 are may be operable independently or in combination, to drive the compressor 42*a*.

In an embodiment, the second compressing device 40*b* is also a three-wheel air cycle machine. In the illustrated, non-limiting embodiment, the second compressing device 40*b* includes a compressor 42*b*, a turbine 44*b*, and a fan 50 operably coupled to each other via a shaft 46*b*. The fan 50 is a mechanical device that can force via push or pull methods a medium (e.g., ram air) through the shell 32 across the one or more ram heat exchangers 34, 36 and at a variable cooling flow rate to control temperatures. Although the fan 50 is illustrated as being part of the second compressing device 40*b*, in other embodiments, the fan 50 may be separate from the compressing device 40*b*, and driven by another suitable means. In such instances, the fan may be electrically driven, may be a tip turbine fan, or may be part of a simple cycle machine for example.

The system 20 may additionally include a dehumidification system. In the illustrated, non-limiting embodiment of FIG. 1, the dehumidification system includes a condenser 52 and a water extractor or collector 54 arranged downstream from the condenser 52. The condenser 52 and the water collector 54 are arranged in fluid communication with the flow of the second medium A2. The condenser 52 is a particular type of heat exchanger and the water collector 54 is a mechanical device that performs a process of removing water from a medium. In the non-limiting embodiment of FIG. 1, the condenser 52 of the dehumidification system is illustrated as a separate heat exchanger located downstream from and arranged in fluid communication with an outlet of the second heat exchanger 36. However, the configuration of the at least one dehumidification system may vary.

In the non-limiting embodiments of FIGS. 2-5, the condenser 52 is formed integrally with the secondary heat exchanger 36. For example, the second medium A2 is configured to flow through a first portion of the heat exchanger that forms the secondary heat exchanger 36, and then through a second, downstream portion of the heat exchanger, which forms the condenser 52. In such embodiments, although the entire heat exchanger is arranged within the ram air shell 32, a divider 56 wall may extend parallel to the flow of ram air through the shell 32 at the interface between the first and second portions of the heat exchanger to separate the ram air shell 32 into a distinct first region 58 and second region 59. Accordingly, the fan 50 of the second compressing device 40*b* is operable to draw ram air through the first region 58, across the primary heat exchanger 34 and the first portion that forms a secondary heat exchanger 36. A fluid flow, distinct from the ram air flow to be described in more detail below, is configured to flow through the second region 59, across the second portion of the heat exchanger that forms the condenser 52. However, it should be understood that embodiments where the secondary heat exchanger 36 is arranged within the first region 58, and a condenser 52, separate from and arranged in fluid communication with an outlet of the secondary heat exchanger 36, is arranged within the second region 59 are also within the scope of the disclosure.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system 20 can be regulated to a desired value. For instance, a first valve V1 may be configured to control a supply of the first medium A1 to the system 20, and a second valve V2 may be operable to allow a portion of a medium, such as the first medium A1, to bypass the ram air circuit 30. As a result, operation of the second valve V2 may be used to add heat to the system 20 and to drive the compressing device 40a when needed. A third valve V3 may be operable in the event of a pack failure, such as where the system 20 does not have a sufficient flow of the second medium A2 to meet the demands of the cabin or other loads. In such instances, operation of valve V3 may be used to supplement the flow of second medium A2 with first medium A1, such as at a location upstream from the dehumidification system for example, to meet the demands of the aircraft.

Operation of a fourth valve V4 may be used to allow a portion of the second medium A2 to bypass the dehumidification system and the turbine 44b of the second compressing device 40b and operation of a fifth valve V5 may be configured to allow a portion of the second medium A2 to bypass the turbine 44b of the second compressing device 40b. In an embodiment, a sixth valve V6 is a surge control valve, operable to exhaust a portion of the second medium A2 output from the compressor 42b of the second compressing device 40b overboard or into the ram air circuit 30 to prevent a compressor surge. A seventh valve V7 may be configured to control a supply of a third medium A3 provided to the power turbine 48 of the second compressing device 40b.

With continued reference to FIGS. 1 and 2, the system 20 is operable in a plurality of modes, selectable based on a flight condition of the aircraft. For example, the system 20 may be operable in a first, low altitude mode or a second, high altitude mode. The first, low altitude mode is typically used for ground and low altitude flight conditions, such as ground idle, taxi, take-off, and hold conditions, and the second, high altitude mode may be used at high altitude cruise, climb, and descent flight conditions.

In the first, low altitude mode, valve V1 is open, and a high pressure first medium A1, such as bleed air drawn from an engine or APU, is provided to the primary heat exchanger 34. Within the first heat exchanger 34, the first medium A1 is cooled via a flow of ram air, driven by the fan 50. As shown in FIG. 1, the cool first medium A1 passes sequentially from the first heat exchanger 34 to another heat exchanger 60, where the first medium A1 is further cooled by another medium, distinct from the ram air. In other embodiments, best shown in FIG. 2, the heat exchanger 60 may be integrally formed with the primary heat exchanger 34 and is positioned within the second region 59 of the ram air circuit 30.

From the heat exchanger 60, the further cooled first medium A1 is provided to the inlet of the turbine 44a of the first compressing device 40a. The high pressure first medium A1 is expanded across the turbine 44a and work is extracted therefrom. The first medium A1 output from the turbine 44a has a reduced temperature and pressure relative to the first medium A1 provided to the inlet of the turbine 44a. The first medium A1 at the outlet of the turbine 44a may be used to cool the second medium A2 within the condenser 52, to be described in more detail below, and/or to cool the first medium A1 within the heat exchanger 60. This cooling may occur separately from (FIG. 1) or within the second region 59 of the ram air circuit 30 (FIG. 2). After receiving heat within heat exchanger 60, the first medium A1 may be exhausted overboard or outside the aircraft. In an embodiment, best shown in FIG. 2, a wall or barrier 61 may be arranged at an upstream end of the second region 59 to prevent another medium, separate from the medium output from the first compressing device 40a from passing through the second region 59. Although such a barrier 61 is illustrated in FIG. 2, it should be understood that any of the embodiments of the ram air system including a separate first and second region 58, 59 may include such a barrier 61.

The work extracted from the first medium A1 in the turbine 44a, drives the compressor 42a, which is used to compress a second medium A2 provided from an aircraft inlet 24. As shown, the second medium A2, such as fresh air for example, is drawn from an upstream end of the ram air circuit 30 or from another source, and provided to an inlet of the compressor 42a. The act of compressing the second medium A2, heats the second medium A2 and increases the pressure of the second medium A2. In an embodiment, a configuration of the compressor 42a is selected to increase the pressure of the second medium A2 to less than double its starting pressure.

During normal operation, the second medium A2 output from the compressor 42a of the first compressing device 40a is provided to the compressor 42b of the second compressing device 40b. Within the compressor 42b, the second medium A2 is further heated and pressurized. Accordingly, the second medium A2 is configured to flow through the compressor 42a of the first compressing device 40a and the compressor 42b of the second compressing device 40b in series.

In some embodiments, the compressed second medium A2 output from the compressor 42b is provided to an ozone removal heat exchanger 62, before being provided to the secondary heat exchanger 36 where it is cooled by ram air. In the illustrated, non-limiting embodiment, the first medium A1 and the second medium A2 are configured to flow through the primary and second heat exchangers 34, 36, respectively, in the same direction relative to the ram air flow. However, embodiments where the first and second mediums A1, A2 flow in different directions are also within the scope of the disclosure.

The second medium A2 exiting the secondary heat exchanger 36 is then provided to the condenser 52, where the second medium A2 is further cooled by the first medium A1 output from the turbine 44a of the first compressing device 40a. From the condenser 52, the second medium A2 is provided to the water collector 54 where any free moisture is removed, to produce cool medium pressure air. This cool pressurized second medium A2 then enters the turbine 44b where work is extracted from the second medium A2 and used to drive the compressor 42b and the fan 50. The second medium A2 output from the turbine 44b is then sent to one or more loads of the aircraft, such as to condition the volume or chamber 26.

The high altitude mode of operation is similar to the low altitude mode of operation. However, in some embodiments, valve V2 may be open to allow at least a portion of the first medium A1 to bypass the primary heat exchanger 34 and heat exchanger 60. Valve V2 may be operated to control, and in some embodiments, maximize, the temperature of the first medium A1 provided to the turbine 44a of the first compressing device 40a. In an embodiment, the pressure ratio across the turbine is less than a conventional turbine. As a result, the work extracted from the first medium A1 within the turbine 44a may be optimized while exhausting the first medium A1 therefrom with a temperature suitable to function as a heat sink with respect to the condenser 52 and/or heat exchanger 60.

In the high altitude mode of operation, the compressor 42a of the first compressing device 40a may be operable to increase the pressure of the second medium A2 up to four times its initial pressure. Although not shown, in an embodiment, the second medium A2 may be cooled between the outlet of the compressor 42a of the first compressing device 40a and the inlet of the compressor 42b of the second compressing device 40b, such as within an outflow heat exchanger. In such embodiments, the second medium A2 may be cooled via any suitable medium, including, but not limited to the third medium A3 for example.

In the illustrated, non-limiting embodiment, the third medium A3 provided to the system 20 via inlet 28 is delivered to the power turbine 48 of the first compressing device 40a. The additional work extracted from the third medium A3 within the power turbine 48, is used in combination with the work extracted from the first medium A1, to drive the compressor 42a. As shown, the third medium A3 may be mixed with the first medium A1 at a mixing point MP1. In the illustrated, non-limiting embodiment, the mixing point MP1 is located downstream from an outlet of the turbine 44a and from the power turbine 48. However, embodiments where the mixing point MP1 is arranged directly at the outlet of the turbine 44a, are also within the scope of the disclosure. In the high altitude mode of operation, this mixture of first medium and third medium A1+A3 may be used to cool the second medium A2 within the condenser 52, and/or to cool the first medium A1 within the heat exchanger 60.

The second medium A2 output from the compressor 42a of the first compressing device 40a and/or the compressor 42b of the second compressing device 40b may be configured to follow the same flow path with respect to the secondary heat exchanger 36 and condenser 52 as previously described for the low altitude mode of operation. In an embodiment, valve V5 is open in the high altitude mode. As a result, at least a portion of the second medium A2 output from the condenser 52 bypasses the water collector 54 and the turbine 44b of the second compressing device 40b.

Depending on the temperature and humidity conditions of the day, the second medium output from the condenser 52 may be too cold to provide directly to the cabin or chamber 26, via valve V5. In such instances, during the high altitude mode of operation, valve V4 may also be opened, thereby allowing a portion of the heated second medium A2 output from either the compressor 42a or the compressor 42b to mix with the cold second medium A2 upstream from an outlet of the system 20. Accordingly, valve V4 can be controlled to achieve a second medium A2 having a desired temperature for conditioning the cabin 26.

Figure 3:
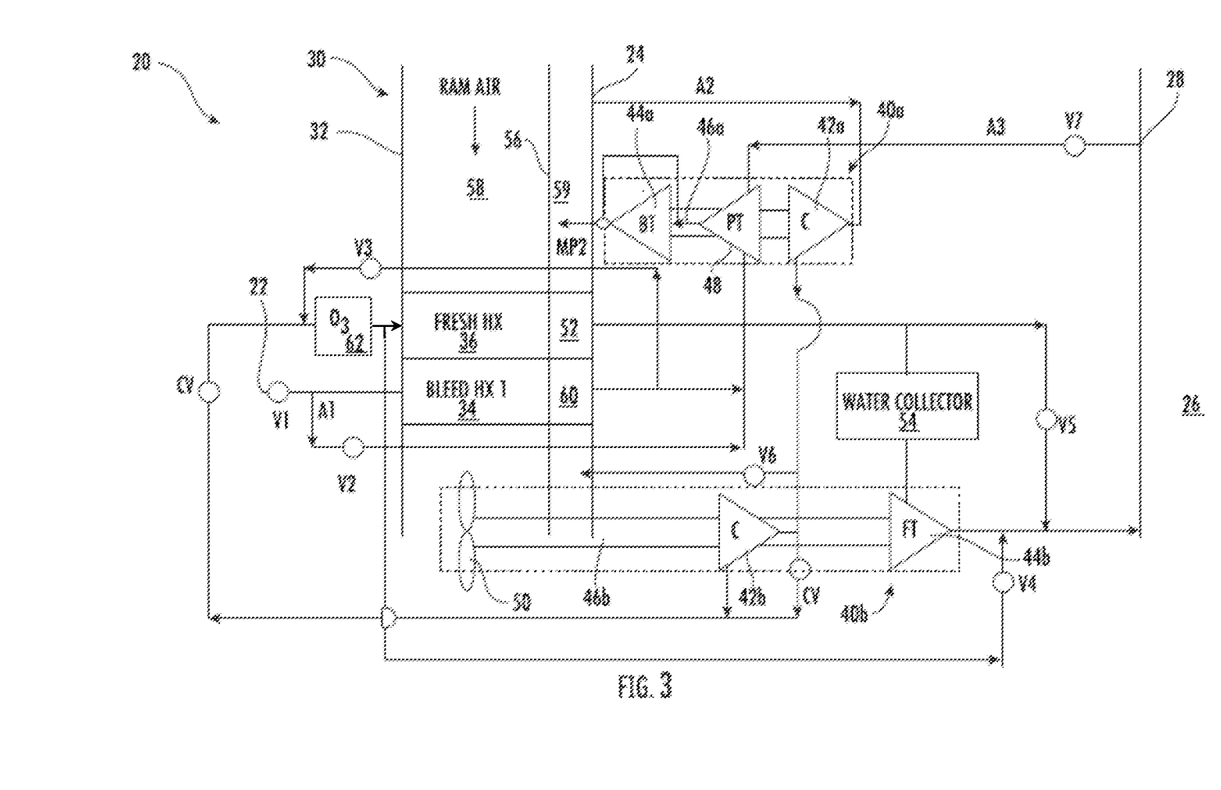
FIG. 3 is a simplified schematic of a system according to another embodiment.

With reference now to FIG. 3, another configuration of the system 20 is illustrated. The system 20 is similar to the configuration of FIG. 2; however, in the illustrated, non-limiting embodiment, the compressor 42a is arranged at an end of the shaft 46a, the turbine 44a is arranged at an opposite end of the shaft, closes to the ram air circuit 30, and the power turbine is arranged between the compressor 42a and the turbine 44a. This is different from the configuration of FIGS. 1 and 2, where the compressor 42a was mounted at a center of the shaft 46a, between the turbine 44a, and the power turbine 48. In the embodiment illustrated in FIG. 3, the mixing point MP2 of the third medium A3 output from the power turbine 48 and the first medium A1 output from the turbine 44a may be arranged at or downstream from the outlet of the turbine 44a.

Figure 4:
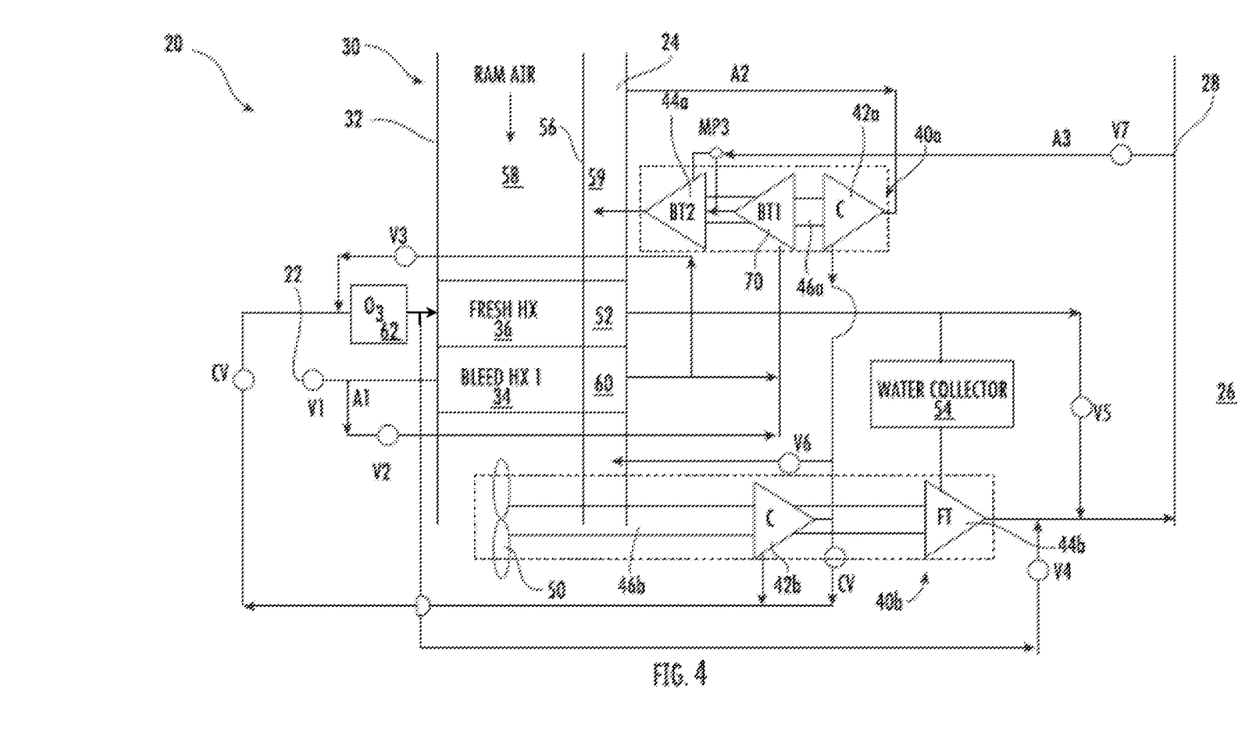
FIG. 4 is a simplified schematic of a system according to another embodiment.

Yet another configuration of the system 20 is illustrated in the non-limiting embodiment of FIG. 4. As shown, the system 20 is substantially similar to the configuration of the system illustrated and described with respect to FIG. 3; however, the compressing device 40a includes a bleed turbine 70 in place of the power turbine 48. Accordingly, during both the low altitude and high altitude modes of operation, the first medium A1 is provided to the bleed turbine 70 and then to the turbine 44a sequentially. The work extracted from the first medium A1 in both turbines 70, 44a is used to drive the compressor. Further, the first medium A1 output from the first turbine 44a is used to cool the flows of medium within the condenser 52 and/or the heat exchanger 60. As previously described, in a high altitude mode of operation, the third medium A3 is additionally provided to the system 20 and work is extracted therefrom. As shown, the third medium A3 is mixed at a mixing point MP3 with the first medium A1. In the illustrated, non-limiting embodiment, the mixing point MP3 is located downstream from an outlet of the bleed turbine 70 and upstream from an inlet of the first turbine 44a. By mixing the plurality of mediums within the air cycle machine, the complexity of the housing of the compressing device 40a is reduced since only a single outlet for both the first medium and the third medium is formed therein.

In an embodiment, the pressure ratio of one or more of the turbines of the first compressing device 40a is reduced relative to existing turbines. As used herein, the term "pressure ratio" is intended to describe the ratio of the pressure of the medium provided to an inlet of the turbine and the pressure of the medium provided at the outlet of the turbine. In an embodiment, such as embodiments of the system 20 including a plurality of turbines 44a, 70 arranged in series relative to a flow of one or more mediums, the pressure ratio of each of the turbines may be reduced compared to conventional turbines. By using a plurality of turbines having a reduced pressure ratio in series, the energy extracted from the medium within the turbines may be maximized.

Figure 5:
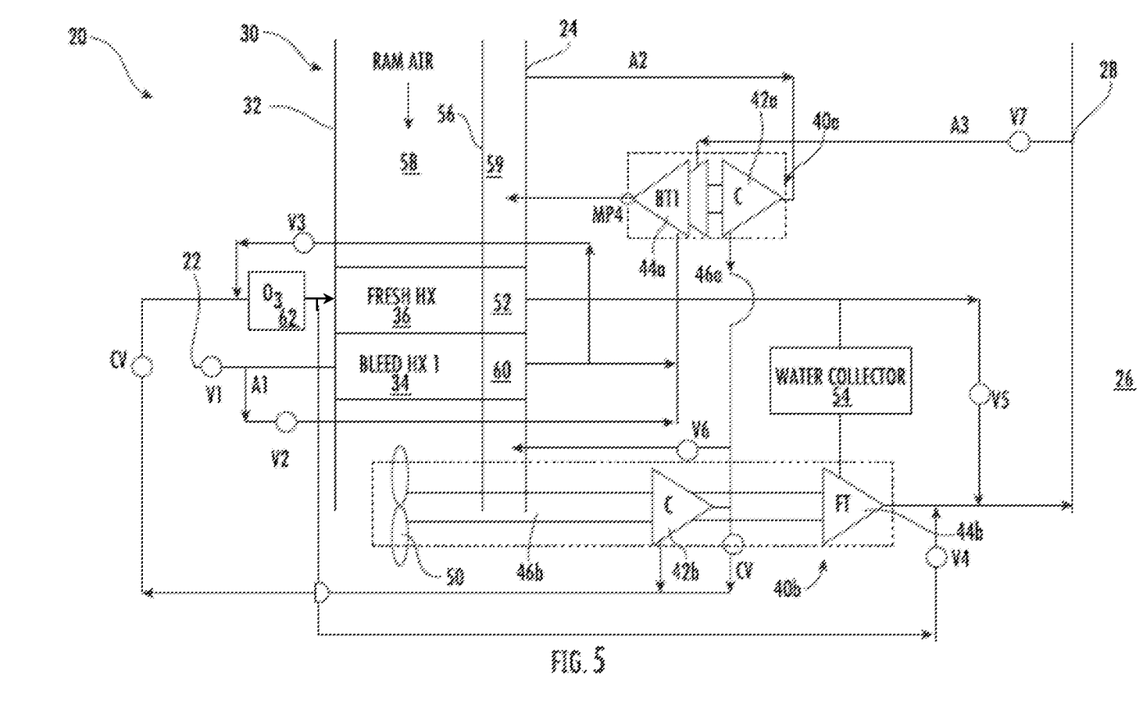
FIG. 5 is a simplified schematic of a system according to yet another embodiment.

With reference now to FIG. 5, the first compressing device 40a of the system 20 is a two-wheel air cycle machine. In the illustrated, non-limiting embodiment, the first compressing device 40a includes a compressor 42a and the turbine 44a is a dual entry turbine. The dual entry turbine is configured to receive a plurality of flows, such as of different mediums for example. A dual entry turbine typically has multiple nozzles, each of which is configured to receive a distinct flow of medium at a different entry point, such that multiple flows can be received simultaneously. For example, the turbine can include a plurality of inlet flow paths, such as an inner flow path and an outer flow path, to enable mixing of the medium flows at the exit of the turbine. The inner flow path can be a first diameter, and the outer flow path can be a second diameter. Further, the inner flow path can align with one of the first or second nozzles, and the outer flow path can align with the other of the first or second nozzles.

In an embodiment, one of the inlets or nozzles of the dual entry turbine is arranged in fluid communication with the flow path of the first medium A1, such as downstream from an outlet of the heat exchanger 60 for example. Accordingly, during both the first inlet of the dual entry turbine. The work extracted from the first medium A1 in the dual entry turbine is used to drive the compressor 42a. As previously described, in a high altitude mode of operation, the third medium A3 is additionally provided to the system 20 and work is extracted therefrom. As shown, the third medium A3 may be provided to a second inlet or nozzle of the dual entry turbine. In such embodiments, the mixing point MP4 of the third medium A3 and the first medium A1 can be at the dual entry turbine, such as at an outlet of the turbine for example, or alternatively, may be downstream therefrom.

Figure 6:
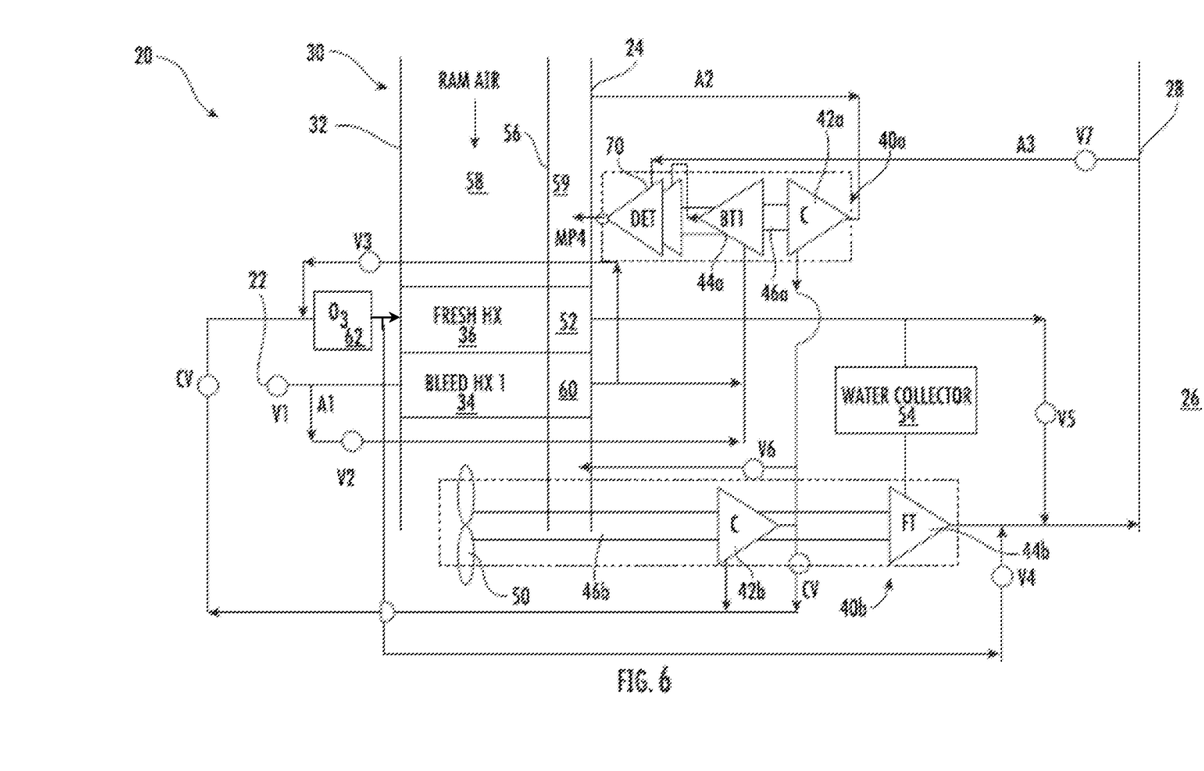
FIG. 6 is a simplified schematic of a system according to yet another embodiment

With reference now to FIG. 6, in another embodiment, the compressing device 40a includes a dual entry turbine 70 in addition to turbine 44a. As shown, one of the inlets or nozzles of the dual entry turbine 70 is arranged downstream from and in series with an outlet the turbine 44a. Accordingly, during both the low altitude and high altitude modes of operation, the first medium A1 is provided to turbine 44a then to the dual entry turbine 70 sequentially. The work extracted from the first medium A1 in both the turbine 44a and the dual entry turbine 70 is used to drive the compressor 42a. Further, the first medium A1 output from the dual entry turbine 70 is used to cool the flows of medium within the condenser 52 and/or the heat exchanger 60. As previously described, in a high altitude mode of operation, the third medium A3 is additionally provided to the system 20 and work is extracted therefrom. As shown, the third medium A3 may be provided to a second inlet or nozzle of the dual entry turbine 70. In such embodiments, the mixing point MP of the third medium A3 and the first medium A1 is located at the dual entry turbine 70, such as at an outlet of the turbine 70 for example, or alternatively, may be downstream therefrom.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air cycle machine for an environmental control system for an aircraft, the air cycle machine comprising:
   at least one turbine configured to receive and extract work from a first medium and a third medium;
   a compressor configured to compress a second medium;
   a shaft mechanically coupling the at least one turbine and the compressor;
   a mixing point located downstream of the at least one turbine, wherein a mixture of the first medium and the third medium generated at the mixing point is provided to another component of the environmental control system;
   a ram air circuit having at least one ram air heat exchanger arranged therein, the at least one ram air heat exchanger being the another component of the environmental control system; and
   a divider arranged within the ram air circuit to form a first region and a second region, the at least one heat exchanger having a first portion arranged within the first region and a second portion arranged within the second region.

2. The air cycle machine of claim 1, wherein the at least one turbine includes a first turbine configured to receive and extract work from the first medium and a second turbine configured to receive and extract work from the third medium.

3. The air cycle machine of claim 2, wherein the mixing point is located downstream of the first turbine and the second turbine.

4. The air cycle machine of claim 2, wherein the first turbine is positioned adjacent a first end of the shaft and the second turbine is positioned adjacent a second end of the shaft.

5. The air cycle machine of claim 2, wherein the first turbine is positioned adjacent a first end of the shaft and the compressor is positioned adjacent a second end of the shaft.

6. The air cycle machine of claim 2, wherein the mixing point is located upstream of the second turbine.

7. The air cycle machine of claim 6, wherein the first turbine and the second turbine are arranged in series such that the second turbine is also configured to receive and extract work from the first medium.

8. The air cycle machine of claim 1, wherein the at least one turbine includes a first nozzle for receiving the first medium and a second nozzle for receiving the third medium.

9. The air cycle machine of claim 1, wherein the first medium is bleed air.

10. The air cycle machine of claim 1, wherein the second medium is fresh air.

11. The air cycle machine of claim 1, wherein the third medium is cabin air.

12. The air cycle machine of claim 1, wherein the mixture of the first medium and the third medium is delivered to the second region of the ram air circuit.

* * * * *